June 25, 1957 E. E. TANGARD 2,797,017
CLOSURE FOR PRESSURE VESSELS
Filed July 6, 1954 2 Sheets-Sheet 1

INVENTOR
Einar E. Tangard
BY
ATTORNEY

June 25, 1957  E. E. TANGARD  2,797,017
CLOSURE FOR PRESSURE VESSELS
Filed July 6, 1954  2 Sheets-Sheet 2

INVENTOR
Einar E. Tangard
BY
ATTORNEY

# United States Patent Office 2,797,017
Patented June 25, 1957

2,797,017
CLOSURE FOR PRESSURE VESSELS

Einar E. Tangard, Scarsdale, N. Y., assignor to Combustion Engineering, Inc., New York, N. Y., a corporation of Delaware Application July 6, 1954, Serial No. 441,399

5 Claims. (Cl. 220—46)

This invention relates to pressure vessels provided with removable closures and particularly to vessels of large diameter subjected to very high internal pressures and having a relatively large closure or closures connected thereto in a fluidtight manner capable of withstanding these high internal pressures yet capable of being readily removed to permit access to the interior of the vessels.

In certain industrial processes large vessels are employed and are operated under very high internal pressures, as for example, 2000 pounds and higher per square inch. It is often required that access openings be provided in these vessels which permit the insertion and removal of very large equipment necessitating the diameter of these openings being approximately equal to the internal diameter of the vessel. With these very high internal pressures and large diameters it will be appreciated that a very large force is applied to the closures for the access openings rendering the problem of positively securing the closures within these openings in a fluid tight manner a difficult one.

It is an object of this invention to provide such a pressure vessel with a closure secured within the opening in a relatively simple yet highly satisfactory manner which positively prevents the relatively high pressure within the vessel from forcing the closure from the opening but permits the closure to be readily removed when desired. It is a further object of this invention to provide a fluid tight juncture between the closure and the vessel which is positive in its sealing action but which permits the closure to be readily removed.

Other and further objects of the invention will become apparent to those skilled in the art as the description proceeds.

With the aforementioned objects in view, the invention comprises an arrangement construction and combination of the elements of the inventive organization in such a manner as to attain the results desired as hereinafter more particularly set forth in the following detailed description of an illustrative embodiment, said embodiment being shown by the accompanying drawings wherein.

Figure 5:
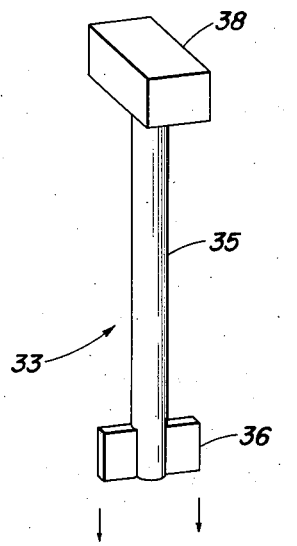
Figure 6:
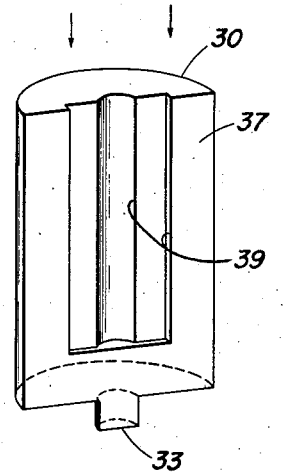

Figures 5 and 6 comprise an exploded view showing an element of the retaining mechanism together with the actuating means therefore.

Figure 1:
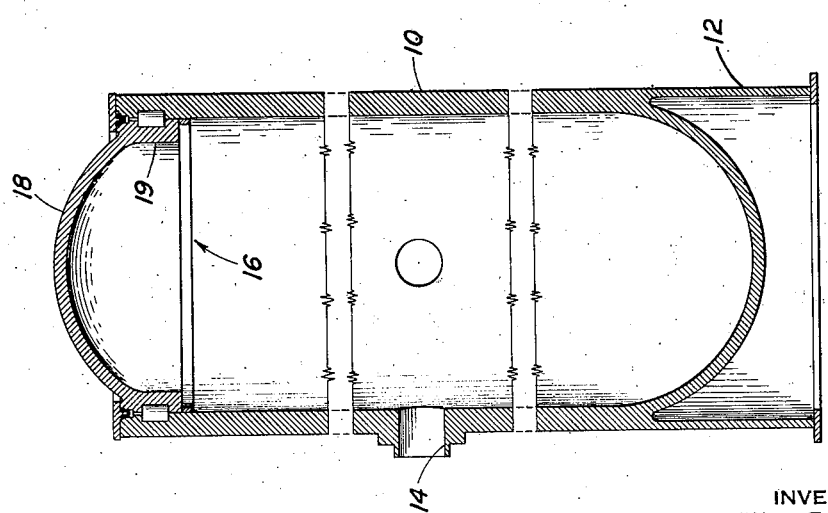
Figure 1 is a vertical sectional view of a pressure vessel embodying the present invention.

Referring now to the drawings, wherein like reference characters are used throughout to designate like elements the organization of Figure 1 comprises a pressure vessel 10 which is illustratively disclosed in the general form of a vertical cylinder supported upon skirt 12. This vessel is of large diameter and has its upper end open at 16 to permit the insertion and removal of large equipment. In the illustrated vessel, relatively small radial openings 14 may be provided in the vertical wall in order to permit the attachment of piping and/or the insertion of various actuating mechanisms into the vessel and instrumentation of the vessel with these openings normally being sealed in a fluidtight manner.

Received within the opening 16 in the upper end of the vessel is closure 18 which includes a downwardly extending cylindrical skirt portion 19 that extends well into the opening 16 having its inner end in contact with stop ring 20 when the closure is initially inserted into the opening and having its peripheral surface juxtaposed to the inner surface of the vessel.

Figure 4:
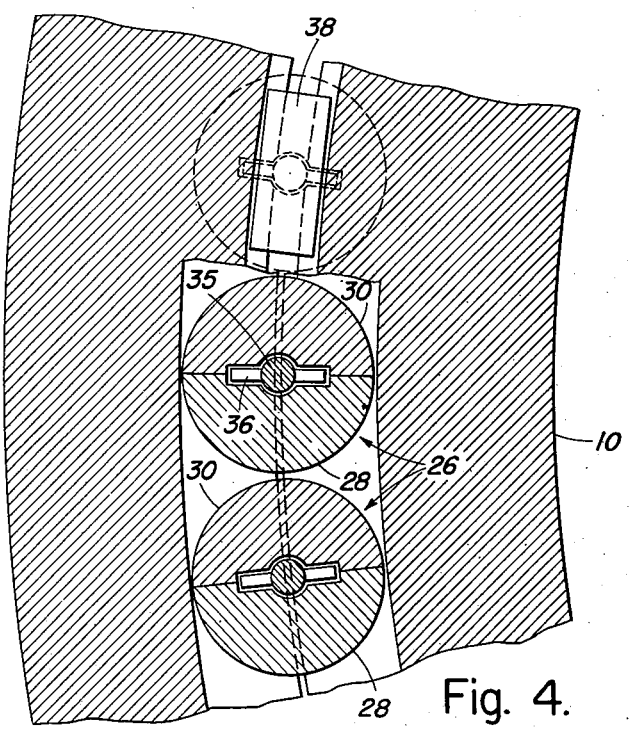
Figure 4 is a fragmentary transverse sectional view taken along line 4—4 of Figure 3 and showing further details of the mechanism for retaining the closure within the vessel.

In carrying out a process within the vessel 10 the internal pressure of the vessel may exceed 2000 per square inch resulting in the application of a tremendous force on closure 18 tending to force the closure outwardly of opening 16. To positively retain the closure within this opening 16 against the tremendous force thus created, complementary annular recesses 22 and 24 are provided in the inner surface of the vessel wall and the outer surface of skirt 19 of the closure 18 respectively, and within these complementary recesses is positioned the cylindrical locking members 26 with adjacent locking members being in side by side relation as shown in Fig. 4. These locking members are longitudinally divided into two semi-cylindrical halves 28 and 30, Fig. 4, and are snugly received within the complementary recesses 22 and 24 with the radial and axial dimension of each of these recesses being only slightly greater than the radius and lengths, respectively, of the cylindrical locking member.

Each of the locking members 26 is mounted so that it can be rotated about its longitudinal axis which is parallel with the axis of closure 18, and for this purpose each of the halves 28 and 30 has a semi-cylindrical lug or bearing portion 32 journaled within the cylindrical bore 34 formed partially within the vessel wall and partially within the skirt portion 19.

The actuator for rotating the cylindrical locking members about their longitudinal axes comprises an elongated stem 35 to the inner end of which is secured across member 36 and which has provided at its outer end handle 38 (Fig. 5) disposed at right angle to cross member 36. Each of the semi-cylindrical halves 28 and 30 have their flat mating surfaces 37 provided with longitudinal grooves 39 for the reception of cross member 36 and stem 35 in a manner to permit the stem and cross member to slide longitudinally within the groove but prevent the same from rotating relative to the locking member about the longitudinal axis of the locking member. The stem 35 extends upwardly from the locking member through the annulus 40 provided between the vessel wall and skirt portion 19 with handle 38 reposing at the bottom of the enlarged annulus 42 immediately above annulus 44 when the actuator occupies its lowermost position within the locking members.

Since the cylindrical locking members 26 are divided into identical semi-cylindrical portions and since the axes of rotation of the locking members lies intermediate the outer surface of skirt 19 and the inner surface of the vessel wall, when all of the locking members are positioned so that the mating surfaces of the two semi-cylindrical halves 28 and 30 are normal to a line radial of the axis of vessel 10 and passing through the axis of the locking members, or in other words, when each of the halves is wholly contained within one of the recesses 22 or 24, closure 18 may be removed from the opening 16 with one of these semi-cylindrical halves of each locking member 26 remaining in recess 22 in the vessel wall and the other remaining in recess 24 in skirt 19. When locking members 26 occupy any other position, however, each of the semi-cylindrical halves 26 and 28 will be disposed partly in recess 22 and partly in recess 24 making the removal of closure 18 from the open end of the vessel impossible.

In positioning closure 18 within opening 16 at the upper end of vessel 10 the semi-cylindrical halves 28 and 30 of each of the cylindrical locking members 26 are disposed so that the two halves are wholly contained within a different one of the annular recesses 22 and 24. The closure 18 is then lowered into opening 16 and into engagement with stop ring 20 after which the closure is rotated relative to the vessel until the semi-cylindrical halves in recesses 22 and 24 are matched or radially opposite each other. The inner or lower ends of actuators 33 are then inserted through annular recess 40 into the longitudinal grooves 39. Thereafter these actuators are rotated through ninety degrees, so that the handle portions 38 have their longitudinal dimension extending circumferentially of the annulus 42 with this rotational movement rotating the cylindrical locking members 26 ninety degrees causing each of the halves to be disposed partly in recess 24 and partly in recess 22 thus preventing removal of closure 18 from opening 16. The actuators 33 are then moved downward with handle 38 being moved to the bottom of recess 42.

Figure 2:
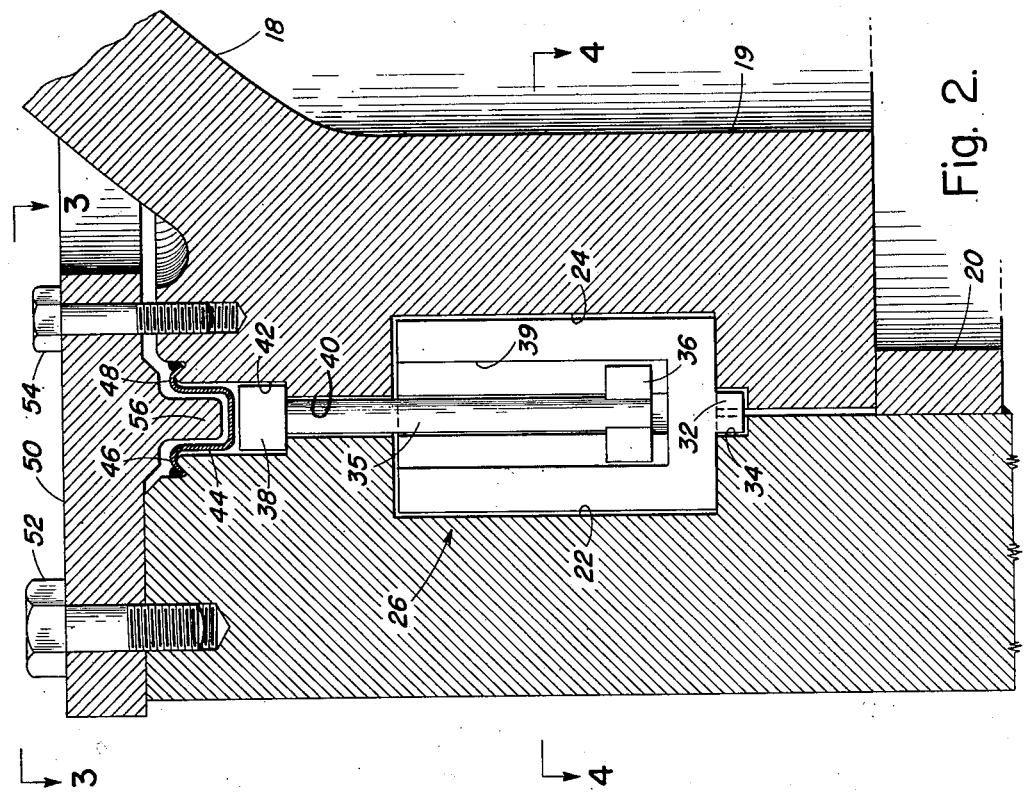
Figure 2 is a detailed fragmentary section of the juncture of the closure and vessel showing in detail the mechanism for retaining the closure within the vessel and the fluid-tight seal means interconnecting the closure and vessel.
Figure 3:
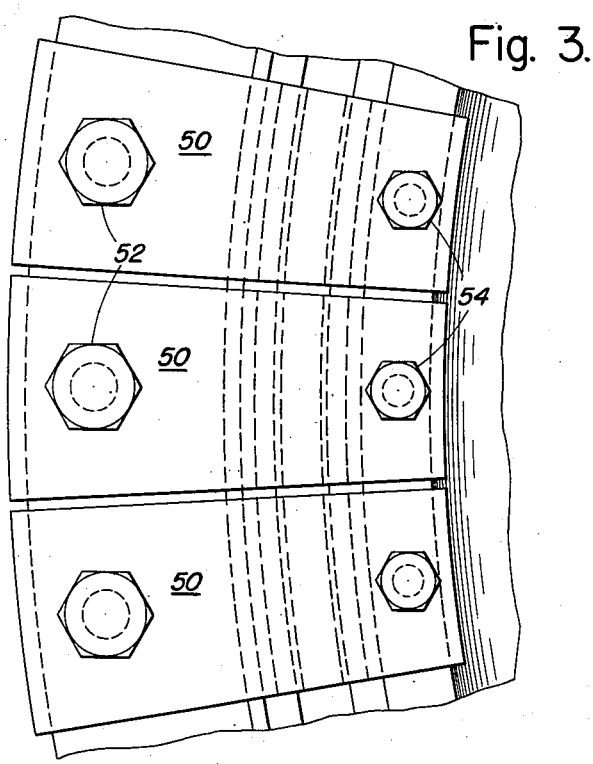
Figure 3 is a fragmentary plane view taken generally from line 3—3 of Figure 2.

Fluid leakage from the interior of vessel 10 past closure 18 is prevented by the annular metallic seal 44 which has a U-shaped transverse section and extends into annulus 42 and is located above handle 38 of the actuators. This seal is of course positioned within annulus 42 after the cylindrical locking members have been rotated ninety degrees by means of actuators 33 from their unlocked to their locked positions as mentioned hereinbefore and after the actuators have been depressed to their lowermost position. The metallic seal includes lips 46 and 48 which extend into annular recesses formed in the wall of vessel 10 and the closure 18, respectively, and are welded thereto in a fluidtight manner. Prior to the welding operation however, and after the seal has been positioned in place, the arcuate plates 50 are positioned over the end of the vessel wall and the upper end of skirt portion 19, as shown in Figs. 2 and 3, with each of the plates being secured to the vessel wall by bolt 52 and to closure 18 by bolt 54. These arcuate plates extend circumferentially about the upper end of the vessel and are provided with a dependent rim 56 which extends into the opening formed by the metallic seal 44 and conforms to the configuration of the seal.

In securing the arcuate plates 50 in place bolt 52 is first tightened and thereafter bolt 54 is tightened. Since there is a space provided between the lower face of these plates and the upper face of skirt portion 19 of closure 18 this tightening of bolt 54 will draw the closure 18 upward taking up the small amount of lost motion which is necessarily present with the use of the cylindrical locking members, with these locking members then being in engagement with the upper radial surface of annular recess 22 and the lower radial surface of annular recess 24. After all of the plates 50 have been secured in place in this manner two or three adjacent plates are then removed and the lips 46 and 48 of the portion of metallic seal 44 disposed under these removed plates are welded as shown. These plates are then replaced and resecured in the manner hereinbefore described and two or three more adjacent plates are removed and the welding operation performed with this procedure being followed until metallic seal 44 is welded to the wall of vessel 10 and the closure 18 throughout its circumference in a fluidtight manner. By following this procedure closure 18 will not move any appreciable extent upward relative to the vessel wall when pressure is built up within the vessel because the lost motion of the locking mechanism has been wholly taken up, with the only relative movement being that resulting from deformation due to compression and shear forces set up by the high internal pressure which movement the seal is sufficiently flexible to withstand. If this procedure were not followed, upon building up pressure within the vessel, closure 18 would move upward relative to the wall of vessel 10 a distance sufficient to take up this lost motion and this relative movement would put undue strain on metallic seal 44.

By having rim 56 of plates 50 depend into the opening formed by metallic seal 44 and conforming to the configuration of this opening this rim acts as a back up member or support for the metallic seal with this seal being forced against this back up member by the high pressure within vessel 10 resulting in relieving the seal member of a vast majority of the force which it otherwise would have to withstand.

When it is desired to remove closure 18, the arcuate plates 50 are removed and the circumferential welds joining seal 44 to the vessel wall and closure 18 broken. Seal 44 is then removed and actuators 33 elevated so that handle 38 is above recess 42 where it can be rotated. The actuators are then rotated through ninety degrees and then preferably removed. This ninety degree rotation conditions the locking members so that each of the halves 38 and 30 is located entirely within one of the recesses 22 or 24 after which the closure may be removed upwardly from opening 16.

With the organization of the present invention it will be apparent that a relatively simple yet highly effective structural arrangement is provided whereby a large closure is retained within an opening of a pressure vessel in a fluidtight manner in opposition to a relatively large force created by the high internal pressure in the vessel and yet when desired this closure may readily be removed from said opening.

While in the illustrative organization disclosed, the closure is provided on the upper end of the vessel, the vessel may equally well be arranged with the closure on the bottom or on both the top and bottom and the vessel may be spherical rather than cylindrical as disclosed.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In combination, a cylindrical pressure vessel having an open end with an axially disposed cylindrical inner wall surface immediately adjacent said end, a closure positioned within said end and having a cylindrical surface juxtaposed to said inner wall surface, said juxtaposed surfaces having corresponding annular relieved portions which together form an annular recess of rectangular section radially of said vessel with its upper and lower surfaces in parallel planes perpendicular to the longitudinal axis of the vessel, elongated cylindrical locking members extending axially of the recess and mounted within said recess for rotation about their longitudinal axis located intermediate said juxtaposed surfaces and parallel with the longtiudinal axis of the vessel with each of said members comprising two longitudinally separated halves separated along a plane including the longitudinal axis of the member, said members being disposed generally in side by side relation throughout the circumferential distance of the annular recess with an axial dimension slightly less than the corresponding dimension of the recess and being arranged so that when in one rotative position each half is disposed wholly within a different one of the annular relieved portions making up said recess thereby permitting free removal of the closure from the vessel and in another position each half disposed partly in each of said relieved portions thereby positively preventing removal of the closure from the vessel, means located axially outward of said recess and locking members effectively joining the closure and the vessel in a fluidtight manner, and means disposed intermediate the last named means and the locking members and accessible upon removal of said joining means for effecting the rotation of the locking members.

2. In an organization of the type described, a cylindrical pressure vessel having an open end, a closure for said end having a portion depending into said vessel with the peripheral surface of said portion parallel with and in juxtaposition to the inner surface of the vessel and with said juxtaposed surfaces having corresponding annular relieved portions of equal radial depth which together form an annular recess of rectangular section radially of said vessel with its upper and lower surfaces in parallel planes perpendicular to the longitudinal axis of the vessel, stop means operative to limit the inward insertion of the closure with said corresponding relieved portions being radially opposed when said closure is in engagement with said stop means, cylindrical members disposed within said recess with their axes parallel with the axis of the vessel and having a diameter slightly less than the radial dimension of said recess and an axial dimension slightly less than the axial dimension of said recess with said members being disposed in side by side relation throughout the circumferential length of said members and being mounted for rotation about their axis and divided into two equal halves along a plane passing through said axis, means disposed axially outward of said recess operative to seal the juncture of the closure and vessel in a fluidtight manner, and means located axially inward of said last named means and accessible upon removal thereof for effecting rotation of said members.

3. The organization of claim 2 wherein the means for effecting rotation of the cylindrical members comprises individual actuators axially disposed with respect to said members and slidably received in slots formed in said members.

4. In an organization of the type described, a pressure vessel having an opening therein, a closure disposed within said opening with its peripheral wall juxtaposed to the inner surface of the opening, stop means limiting the inward insertion of the closure into the opening, cylindrical locking members disposed about said closure with their axes parallel to the axis of said closure, said locking members being disposed in cooperating recesses formed in said juxtaposed inner surface and peripheral wall with these cooperating recesses being radially opposed when the closure is in engagement with said stop means, each of said recesses having a radial extent slightly larger than the radius of the locking members and an axial dimension slightly larger than the axial dimension of the locking members whereby said locking members are snugly received within cooperating recesses in a manner permitting rotation thereof about their axes with the axial ends of said recesses being complementary with the ends of said locking members, said locking members being disposed in side by side relation about said closure with each locking member being divided into two equal segments along a plane containing the axis thereof, said segments having inwardly extending projections forming a cylindrical lug coaxial with the cylindrical locking member and received with a cylindrical bore provided partly in the closure and partly in the vessel wall, actuating means for rotating each locking member about its axis including a shaft coaxial therewith and carrying a cross arm at its inner end with said shaft and cross arm being received in cooperating slots formed in the segments of the locking member in a manner permitting relative axial movement between the actuating means and the locking member but preventing relative rotary movement therebetween, and means effective to seal the closure and vessel in a fluidtight manner.

5. The organization of claim 4 wherein the seal is positioned at the outer end of the opening and outwardly of the actuating means for the locking members and comprises a U-shaped flexible metallic annulus welded at its radial extremities to the closure and vessel wall respectively and an annular backing member secured to said closure and vessel wall and having a portion corresponding generally to the configuration of the seal and effective to relieve said seal of a majority of the force imposed thereon by the pressure within the vessel.

References Cited in the file of this patent
UNITED STATES PATENTS

| | | |
|---|---|---|
| 401,614 | Weber | Apr. 16, 1889 |
| 1,902,494 | Emmet | Mar. 21, 1933 |
| 1,902,814 | Crowther | Mar. 28, 1933 |
| 2,290,528 | Bertram | July 21, 1942 |